United States Patent [19]

Mauerhofer

[11] Patent Number: 5,668,366
[45] Date of Patent: Sep. 16, 1997

[54] CONTROL DEVICE AND PROCESS FOR THE CONTACTLESS CONTROL OF A UNIT, ESPECIALLY A PLUMBING UNIT

[75] Inventor: Alex Mauerhofer, Vilters, Switzerland

[73] Assignee: Geberit Technik AG, Jona, Switzerland

[21] Appl. No.: 396,685

[22] Filed: Mar. 1, 1995

[30] Foreign Application Priority Data

Mar. 3, 1994 [CH] Switzerland .................. 630/94

[51] Int. Cl.⁶ .................................................. H01J 40/14
[52] U.S. Cl. .................. 250/221; 250/222.1; 340/556
[58] Field of Search .................. 250/221, 222.1, 250/222.2, 239; 340/555–557; 356/4.01, 4.06, 4.07; 4/302, 304, 305; 251/30.03, 30.05, 45

[56] References Cited

U.S. PATENT DOCUMENTS

| | | | |
|---|---|---|---|
| 4,733,081 | 3/1988 | Mizukami | 250/221 |
| 4,879,461 | 11/1989 | Philipp | 250/221 |
| 4,903,009 | 2/1990 | D'Ambrosia et al. | 250/221 |
| 4,970,384 | 11/1990 | Kambe et al. | 250/221 |
| 4,972,070 | 11/1990 | Laverty, Jr. | 250/239 |

FOREIGN PATENT DOCUMENTS 01 955/93  6/1993  Switzerland .

*Primary Examiner*—Que Le
*Attorney, Agent, or Firm*—McGlew & Tuttle

[57] ABSTRACT

An electronic control device for the contactless control of a unit, e.g., a plumbing unit, especially a urinal, with at least one transmitter for sending directed light signals, and with a receiving device. The receiving device receives signals reflected from a scanned object and sends them to a circuit acting on the unit. The transmitter and the receiving device form an optical triangulation arrangement, wherein reflections are received from the background and from a predetermined detection zone to mask the said background.

9 Claims, 3 Drawing Sheets

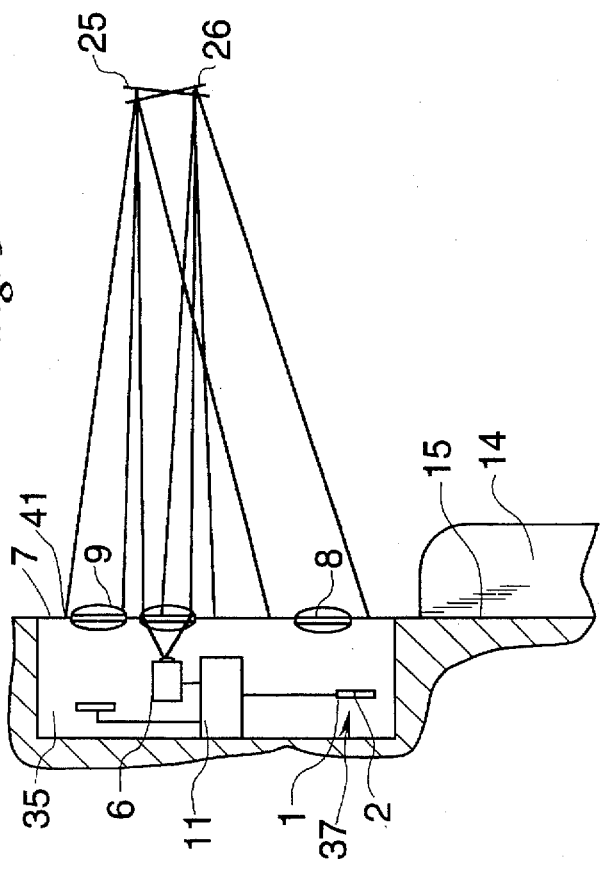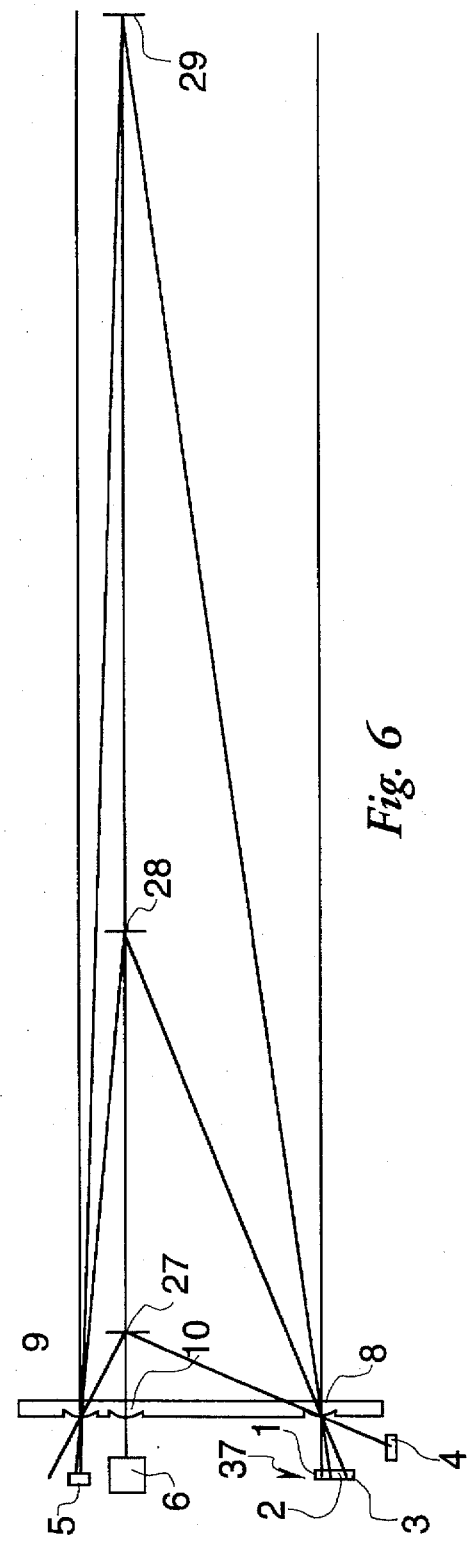

5,668,366

CONTROL DEVICE AND PROCESS FOR THE CONTACTLESS CONTROL OF A UNIT, ESPECIALLY A PLUMBING UNIT

FIELD OF THE INVENTION

The present invention pertains to an electronic control device for the contactless control of a unit, e.g., a plumbing unit, especially a urinal, with at least one transmitter for sending directed light signals, and a receiving means, which receives the signals reflected from a scanned object and sends them to a circuit acting on the unit. The present invention also pertains to a process for the contactless control of a unit.

BACKGROUND OF THE INVENTION

Electronic control devices of this class have been known especially in plumbing units. They have visibly been increasingly used, on the one hand, in public facilities for hygienic reasons, and, on the other hand, generally to reduce the water consumption.

Such control devices for the contactless control of washing units have been known as well. These are based on an infrared sensor system. These have an infrared transmitter operating with continuous, pulsed radiated power. This transmitter is set such that the wash basin is not detected by an infrared receiver operating with an adjustable sensitivity, but an object, e.g., a hand, which is located in the intermediate zone, is. Thus, a contactless control device, which has an infrared light scanner installed in a water circuit, has become known from CH-A-646 766. When a hand is introduced into the detection zone of the light scanner, the latter responds. The detection zone is the area of intersection between a transmitted beam and a received beam. The transmitted power of the infrared radiation source is constant. To mask an existing background, the range of the system is correspondingly limited.

Furthermore, CH-A-651 143 discloses a contactless electronic control device, in which two signal transmitters arranged at spaced locations from one another are provided, which are alternatingly activated. In addition, two receivers are arranged near the signal transmitter, and they are connected such that a valve arranged in the water pipe is opened only when reflections of the signals of both signal transmitters are received. Since two transmitters and two receivers are both necessary, this control device is relatively expensive, and the energy consumption is relatively high.

Finally, a control device equipped with a radar probe has been known for controlling the flushing of a urinal. This probe is a direction recognizing probe and responds to an approaching movement as well as to a subsequent departing movement. This device is also relatively expensive.

SUMMARY AND OBJECTS OF THE INVENTION

The primary object of the present invention is to provide a control device of the above-described type, which has a simpler electrical and mechanical design and is yet more reliable in operation and can be manufactured at lower cost. In particular, the control device shall be suitable for controlling plumbing units and especially a urinal.

This object is attained in a control device of this type by the transmitter and the receiving device forming an optical triangulation arrangement, wherein reflections are received from the background and from a predetermined detection zone in order to mask the said background. Thus, reflections which originate outside the predetermined detection zone are also taken into account in the control device according to the present invention. As a result, it is possible to exactly define the detection zone. The electrical and mechanical design of the control device according to the present invention is very simple, because only one transmitter and one receiver are required. The control device may be accommodated, e.g., behind a cover plate in a wall recess.

The process according to the present invention is characterized in that the receiving device simultaneously receives reflected signals from a predetermined detection zone and signals from a zone forming a background, and that the difference of the two signals is formed to mask the background. Thus, the signals of at least two receivers are subtracted, so that a well-defined switching point is guaranteed even in the ease of a relatively dark scanned object. An especially inexpensive and simple embodiment of the control device according to the present invention is obtained if the receiving device has a differential diode, and a diffusely reflected component of a light spot on the scanned object is imaged onto the said differential diode by means of a lens.

Disturbances due to reflections on a mirror are effectively avoided if, according to a variant of the present invention, a reference receiver is arranged at a spaced location from the receiving device, and, to prevent a switching because of a reflection, switching is performed only when the receiver and the reference receiver each receive a signal. The receiver and the reference receiver always receive a signal in the case of a diffuse reflection to be detected, but only the receiver or the reference receiver receives a signal in the ease of a mirroring reflection that is to be ruled out.

According to an advantageous embodiment of the present invention, a diode, which receives reflections in the close range of the transmitter, is provided.

The control device according to the present invention is suitable especially for controlling a urinal. However, applications in other fields are conceivable as well.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5 is a schematic view of another variant of the control device according to the present invention; and FIG. 6 is a schematic representation of the background masking as well as of the foreground masking in a control device according to the present invention.

DETAILED DESCRIPTION OF THE PREFERRED EMBODIMENT

Figure 1:
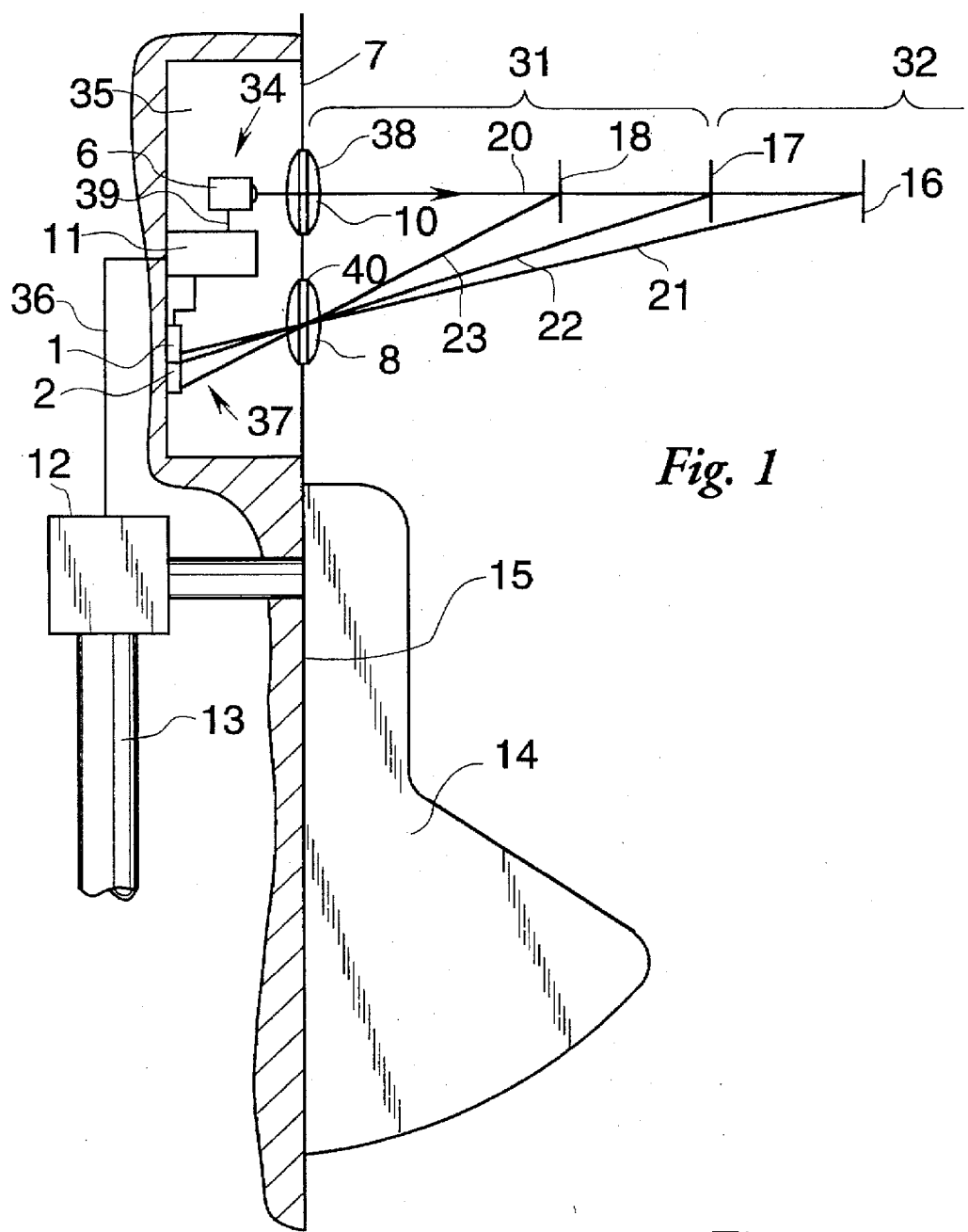
FIG. 1 is a schematic view of a control device according to the present invention on a urinal.

FIG. 1 shows a urinal 14, which is fastened to a building wall 15.

To flush the urinal, it is connected to a water pipe 13. Hushing is started and stopped based on a control signal of a control device 34 with a flushing valve 12 installed in the line 13. The control device 34 is accommodated, e.g., behind a cover 7 in a recess 35 of the building wall 15. An electrical line 36 connects a control unit 11 of the control device 34 to the flushing valve 12.

The control device 34 has a transmitting lens 10, which is fastened in an opening 38 of the cover 7. A transmitter 6, which is connected to the control unit 11 via a line 39, is arranged behind the said transmitting lens 10. The transmitter 6 is preferably a photodiode, which generates infrared light pulses. The minimum detection power of the transmitter 6 is preferably measured and continuously adjusted to the reflection properties of the background, as is explained in greater detail in Swiss Patent No. 01955/93-6. The energy consumption is very low, so that the unit can be operated for approximately 2 years with a battery, not shown. The control device also has a receiver lens 8, which is fastened in an opening 40 of the cover 7 at a spaced location from the transmitting lens 10. A receiving device 37 with a first receiver 1 and with a second receiver 2 is arranged behind the lens 8, somewhat offset in the downward direction. The receivers 1 and 2 are preferably prior-art receiving diodes, which are arranged, as is shown in FIG. 1, next to each other in a plane parallel to the cover 7 at different distances from the transmitter 6.

The transmitter 6 sends directed signals 20 moving away from the wall 15. If a user is located in the detection zone 31, the signals 20 generate on same a light spot, which is not specifically shown here and is diffusely reflected. The receiving lens 8 receives a component 23 of this diffusely reflected radiation, and images it on the second receiver 2.

If the user or another scanned object is located at a switching point 17 located farther away from the transmitter 6, a light spot on the user is likewise diffusely reflected. The reflected component of radiation received by the receiving lens 8 is, however, sent in essentially equal portions to the first receiver 1 and to the second receiver 2.

If the operator is located at a point in the background and consequently at an even greater distance from the transmitter 6, the radiation imaged by the receiving lens 8 is sent mainly to the first receiver 1.

Figure 2:
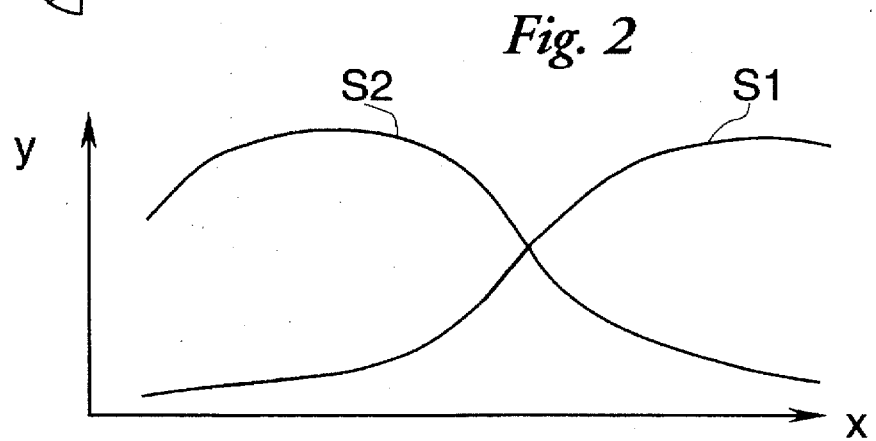
FIG. 2 is a representation of the intensity of the signals at a first receiver and of the signals at a second receiver as a function of the distance of the reflection from the transmitter.

For the arrangement according to FIG. 1, FIG. 2 shows the intensity y of the signals at the receiver 1 (curve S1) as a function of the distance x between a scanned object and the transmitter 6, and correspondingly the intensity of the signals at the receiver 2 (curve S2). As can be seen, the intensity of the signals at the receiver 1 at a distance that is greater than the distance between the switching point 17 and the transmitter 6 is higher than the intensity of the signals at the receiver 2. If the distance between the scanned object and the transmitter 6 is shorter than the distance from the switching point 17, the signals at the receiver 2 are conversely stronger than at the receiver 1. Thus, a scanned object that is located between the switching point 17 and the transmitting lens 10 can be distinguished from a scanned object located in the background by comparing the intensities of the two receivers 1 and 2. These two zones are designated by the reference numbers 31 and 32 in FIG. 1. The switching point 17 is thus recognizable even in the case of relatively dark scanned objects if the signals of the receivers 1 and 2 are subtracted. The receiving device 37 may also have more than two receivers or diodes if a division into more zones is desirable.

Figure 3:
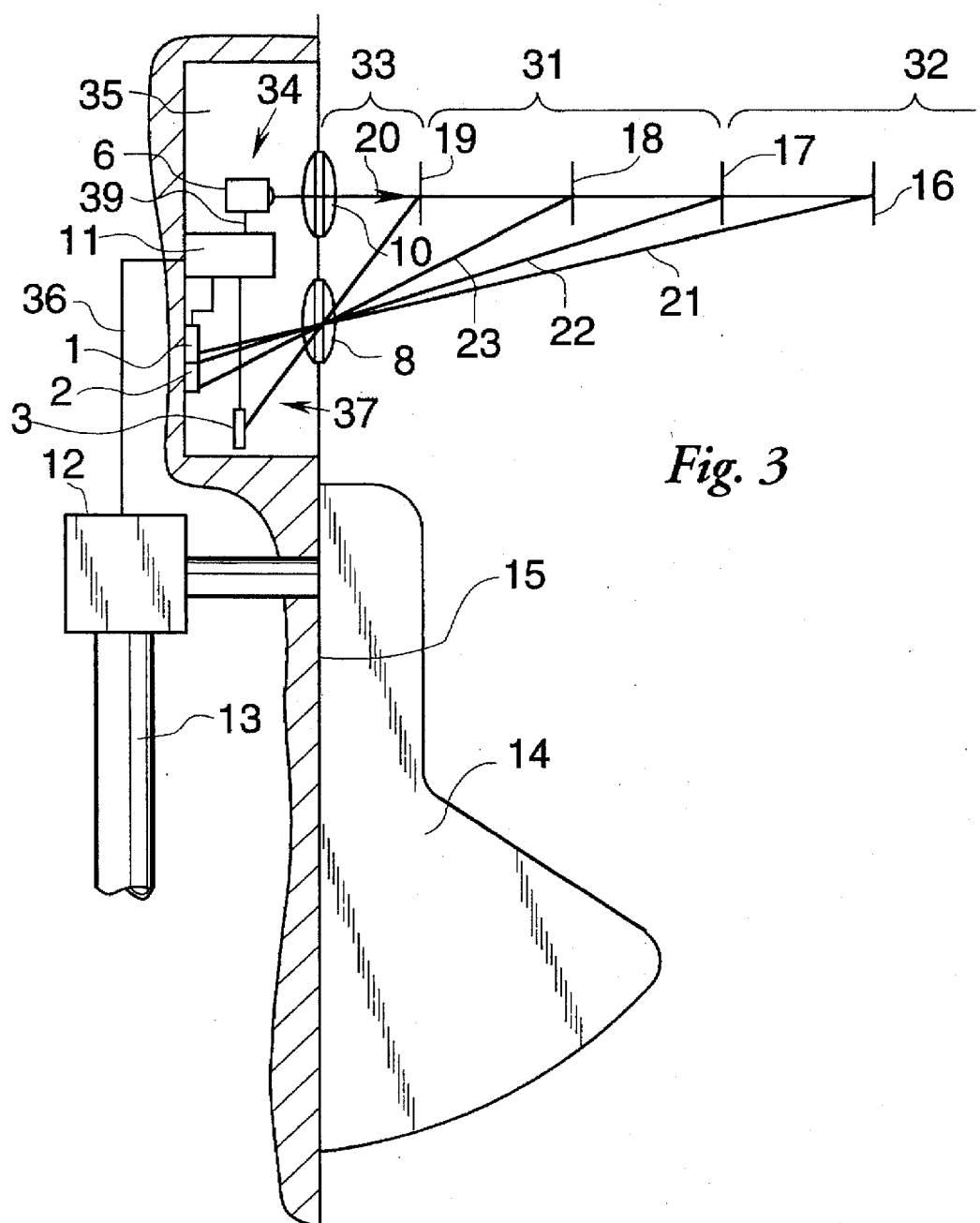
FIG. 3 is a schematic view of a variant of the control device according to the present invention.
Figure 4:
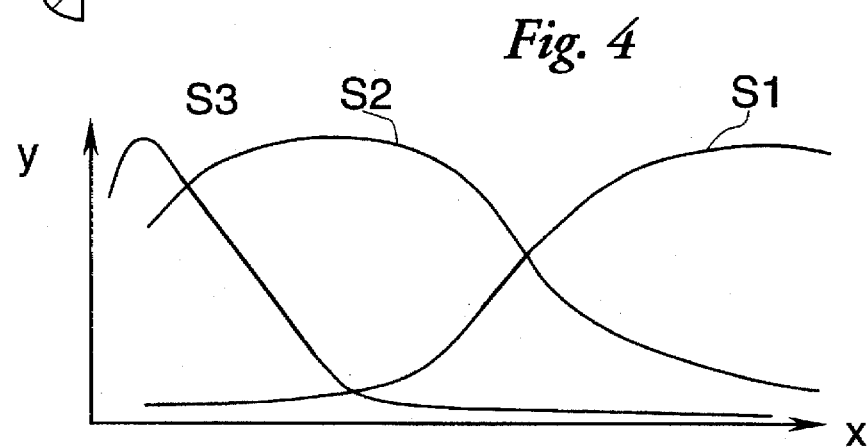
FIG. 4 is a representation according to FIG. 2, but adapted to the embodiment according to FIG. 3.

In the embodiment according to FIGS. 3 and 4, a third receiver 3 is provided, which is also arranged behind the cover 7 at a spaced location from the receiving device. This receiver 3, which may also be a diode, receives mainly signals which are located in a foreground 19. Using this third receiver 3, it is possible to recognize scanned objects in the blind zone. To obtain a defined blind zone in the case of very bright objects, the signals of the receivers 1 and 3 are added.

The variant according to FIG. 5 has an additional receiving lens 9, which is fastened in an opening 41 of the cover 7 at a spaced location from the transmitting lens 10. A reference receiver 5 is arranged behind this additional receiving lens 9. If a mirror 25, which is directed essentially at right angles to the optical axis of the transmitter 6, is located in the background, signals of the transmitter 6 are reflected by the mirror 25 to the receiving lens 9. These reflected signals are imaged by the lens 9 on the reference receiver 5, which sends corresponding signals to the control unit 11. Since the reflections of the mirror 25 are not diffuse, the receiving device 37 does not receive any signals due to the reflections of the mirror 25. If a mirror 26 is inclined toward the receiving device 37, only the receiving device 37 will receive signals, but the reference receiver 5 will not. If a diffusely reflecting scanned object, e.g., a person, is present instead of the mirrors 25 and 26, the receiving device 37 as well as the reference receiver 5 receive signals simultaneously. The simultaneous detection of reflected light in both receivers 37 and 5 can thus be used as a condition for the recognition of a valid scanned object in this embodiment.

FIG. 6 shows a design, in which the receiving device 37 has, next to each other, a first receiver 1, a second receiver 2, as well as a third receiver 3. The receivers 2 and 3 are connected in parallel in order to obtain a larger active surface. In contrast, the receivers 1 and 2, 3 are connected opposite one another in order to make it possible to mask the background beginning from the distance 29, e.g., beginning from 45 cm. If a scanned object is located at the distance 29, the image point is located on the receivers 1, 2 and 3, so that equal amounts of light fall upon the two receivers connected opposite one another, so that the difference is zero. If a scanned object is located at a greater distance, the said difference is always negative or zero. If a scanned object is located at a distance that is shorter than the distance 29, e.g., at the distance 28, which is, e.g., 15 cm, the said difference is positive, and the receiving device 37 is active. Thus, the valve 12 is opened by the control unit 11 in this case. If a scanned object is located at a distance that is shorter than the distance 27, e.g., 5 cm, it is masked by the fourth receiver 4. This receiver 4 is connected in parallel to the receiver 1. Thus, the difference is again negative in the close scanning range, and the receiving device 37 is correspondingly switched off. If a scanned object is located in this close range, e.g., the flushing valve 12 remains closed. The mode of operation of the reference receiver 5 is explained above. As was mentioned above, the use of the control device according to the present invention is not limited to the control of a urinal or another plumbing unit.

While specific embodiments of the invention have been shown and described in detail to illustrate the application of the principles of the invention, it will be understood that the invention may be embodied otherwise without departing from such principles.

What is claimed is:

1. An electronic control device for contactless control of a plumbing unit, comprising:

an actuating circuit connected to the unit; and optical triangulation means including a transmitter for sending directed light signals and a receiving device for receiving signals reflected from a scanned object and for generating an actuation signal applied to said actuating circuit, said receiving device of said optical triangulation means including a background reflection portion receiving reflections predominantly from a background and a detection zone portion for receiving reflections predominantly from a predetermined detection zone, and comparison means for comparing the intensities of reflections received by said background reflection portion and said detection zone portion whereby said reflections received from said detection zone are discernable from reflections received from said background.

2. The device according to claim 1, wherein said receiver device background reflection portion includes a first receiver element and said receiver device detection zone portion includes a second receiver element, said first receiver element being arranged at a distance from said transmitter which distance is different from a distance from said second receiver element to said transmitter, such that a reflection from a scanned object located in said background is imaged essentially on said first receiver element and a reflection from a scanned object located in said detection zone is imaged essentially on said second receiver element.

3. The device according to claim 1, wherein said receiving device includes a differential diode and a receiving lens, said receiving lens being disposed such that a reflection from a scanned object is imaged on said differential diode.

4. The device according to claim 1, further comprising a reference receiver arranged at a spaced location from said receiving device, said receiving device for generating a reflection signal upon sensing a reflection, said receiving device generating a receiving reflection signal upon sensing a reflection, said reference receiver being connected to switching means, said switching means for generating a switching signal only upon receiving said reference reflection signal and said receiving reflection signal simultaneously.

5. The device according to claim 1, further comprising an additional receiver positioned for recognizing an object scanned which is close to said receiving element.

6. The device according to claim 1, wherein said transmitter includes adjustment means for continuously adjusting power of said transmitter based on an intensity of reflections received by said receiving device.

7. The device according to claim 3, wherein said differential diode includes a first diode, a second diode, and a third diode, said second diode and said third diode being connected in parallel to generate said actuation signal upon receiving reflected signals and said third diode being connected to said actuation circuits, said actuation circuit not generating said activation signal when said third diode is also receiving reflected signals.

8. A process for the contactless control of a plumbing unit, comprising the steps of:

transmitting directed light signals with a transmitter;

positioning a receiving device for receiving signals reflected from an object positioned in the path of said directed light signals, said receiving device including a background receiving portion and a detection zone receiving portion;

actuating the unit with a control circuit; and detecting reflected signals, from a background zone at said background receiving portion, said background spaced a distance from the receiver and detecting reflected signals from a predetermined detection zone at said detection zone receiving portion, said detection zone being positioned closer to said receiver than said background zone, and forming a difference between signals from said two zones to discern detection zone reflection signals from background zone signals.

9. An electronic control device for contactless control of a plumbing unit comprising:

an actuating circuit connected to the unit; and optical triangulation means, including a transmitter for sending directed light signals and a receiving device, said receiving device including a first receiver element and a second receiver element, said first receiver element being spaced a first distance from said transmitter and said second receiver element being spaced a second distance from said transmitter, whereby said first receiver element receives reflections predominantly from a background region and said second receiver element receives reflections predominantly from a detection zone, said detection zone being predefined and positioned closer to said transmitter than said background region and an actuating means for comparing the intensities of reflections received by said first receiver element and said second receiver element and generating an actuation signal when the intensity of reflection signals at said second receiver element are greater than said first.

* * * * *